US011606591B1

United States Patent
Grover

(10) Patent No.: US 11,606,591 B1
(45) Date of Patent: Mar. 14, 2023

(54) MANAGING CONTENT SEGMENTS OF LINEAR TV CONTENT AND OVER-THE-TOP (OTT) CONTENT

(71) Applicant: Roku, Inc., San Jose, CA (US)

(72) Inventor: Matthew George Grover, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/746,689

(22) Filed: May 17, 2022

(51) Int. Cl.
*H04N 21/262* (2011.01)
*H04N 21/81* (2011.01)
*H04N 21/845* (2011.01)

(52) U.S. Cl.
CPC ..... *H04N 21/26241* (2013.01); *H04N 21/812* (2013.01); *H04N 21/8456* (2013.01)

(58) Field of Classification Search
CPC .............. H04N 21/26241; H04N 21/812
See application file for complete search history.

(56) References Cited

U.S. PATENT DOCUMENTS 9,451,308 B1 * 9/2016 Liu ................... H04N 21/4126
2016/0165286 A1 * 6/2016 Zhang ............... H04N 21/4532
725/34

* cited by examiner

*Primary Examiner* — Michael H Hong
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for coordinating the display of content segments in linear TV devices and over-the-top (OTT) media devices. A controller can select a content segment from a plurality of content segments of linear TV content provided to a plurality of linear TV devices to be displayed at a TV channel at a scheduled time instance. The controller can further select an OTT time instance separated from the scheduled time instance by a predetermined time interval, and provide a copy of the selected content segment to one or more media devices to be displayed at the one or more media devices at the OTT time instance.

20 Claims, 6 Drawing Sheets

MANAGING CONTENT SEGMENTS OF LINEAR TV CONTENT AND OVER-THE-TOP (OTT) CONTENT

BACKGROUND

Field

This disclosure is generally directed to managing content segments of linear TV content and over-the-top (OTT) content, and more particularly to coordinating the display of content segments in linear TV devices and over-the-top (OTT) media devices.

Background

Traditionally, television (TV) offers viewers access to content via subscription to cable or satellite services or through over-the-air broadcasts. In general, content, such as multimedia content, can be delivered from a content source device operated by a content provider to millions of viewers displayed by linear TV devices. TV content has been offered to the viewers in a linear way in which viewers consume the content and watch programs according to a broadcaster programming schedule. If viewers want to watch their selected content, they have to tune in to a specific TV channel at a specific time. Hence, traditional TV content can also be referred to as linear TV content.

Over-the-top television (OTT) refers to TV content delivered via the internet to various media devices in a live streaming format without the involvement of cable or satellite service providers, where the media devices may include the traditional TV sets or other computing devices. Dynamic advertisement insertion (DAI) can allow a content modification system to swap out advertisements in linear, live, video-on-demand, or streaming content, either in the traditional TV, OTT, or content delivered in any other format. However, challenges remain in coordinating the display of content segments in linear TV devices and over-the-top (OTT) media devices.

SUMMARY

Provided herein are system, apparatus, article of manufacture, method and/or computer program product embodiments, and/or combinations and sub-combinations thereof, for managing content segments of linear TV content and over-the-top (OTT) content to coordinate the display of content segments in linear TV devices and OTT media devices. Techniques presented herein can be applicable to select a content segment of a linear TV content provided to a plurality of linear TV devices to be displayed at a TV channel at a scheduled time instance, and further provide a copy of the selected content segment to one or more media devices at a time instance different from the scheduled time instance for the content segment.

An example embodiment of a computing device can include a storage device and a controller coupled to the storage device. The storage device can store a plurality of content segments. The controller can be configured to select a content segment from the plurality of content segments, where the content segment can be a part of linear TV content provided to a plurality of linear TV devices to be displayed at a TV channel at a scheduled time instance. In some embodiments, the plurality of linear TV devices can be automatic content recognition (ACR) enabled devices, and the content segment is selected based on a number of linear TV devices showing or going to show the content segment at the TV channel according to a program log used by the ACR, where the program log can be received by the computing device from a content source device. In some other embodiments, the content segment can be an advertisement segment of the linear TV content, and can be selected based on an indication from a user.

In some embodiments, the controller can be further configured to select an OTT time instance separated from the scheduled time instance by a predetermined time interval, and provide a copy of the selected content segment to one or more media devices coupled to the computing device to be displayed at the one or more media devices at the OTT time instance. In some embodiments, the copy of the selected content segment can be an OTT advertisement segment. In some embodiments, the one or more media devices can include a device that is capable to perform a dynamic advertisement insertion to insert the copy of the selected content segment to be displayed.

In some embodiments, the OTT time instance can be ahead of and separated from the scheduled time instance by the predetermined time interval, such as within a predetermined time interval of about 30 minutes length. In some embodiments, the OTT time instance can be after and separated from the scheduled time instance by the predetermined time interval.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
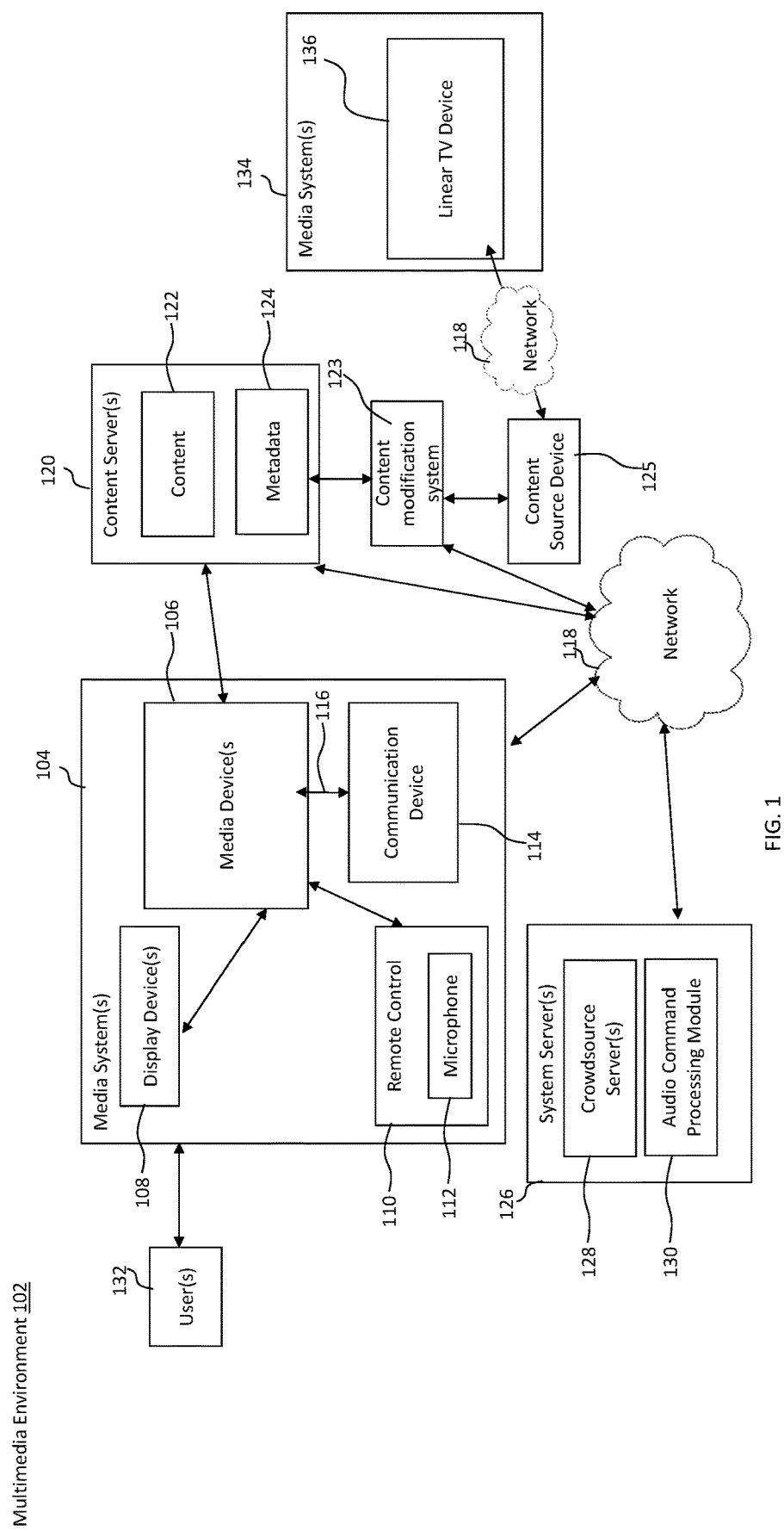
FIG. 1 illustrates a block diagram of a multimedia environment, according to some embodiments.

Traditionally, television (TV) offers viewers access to content distributed via cable or satellite services or through over-the-air broadcasts. Over-the-top television (OTT) refers to TV content distributed via the internet in a live streaming format without the involvement of cable or satellite service providers. A viewer can be referred to as an end-user or a user. In general, to deliver and present content to end-users, a content provider can transmit the content to one or more content distribution systems, such as the Internet, cable or satellite services, each of which can in turn transmit the content to one or more respective content presentation devices or media devices to be output for presentation to respective end-users through display devices. Such a hierarchical arrangement can facilitate convenient, widespread distribution of content.

By way of example, in order for a video content provider to deliver video content to end-users throughout the United States, the video content provider can transmit the video content by satellite or another medium to content distribution systems that serve respective designated market areas (DMAs) within the United States. Each such content distribution system can therefore receive the national satellite feed carrying the video content and can transmit the video content to television sets and/or set-top boxes in the content distribution system's DMA, such that the video content can be output for presentation at display devices to respective end-users in that DMA. In practice, these content distribution systems and their means of transmission to content presentation devices can take various forms. For instance, a content distribution system can be associated with a cable-television provider and can transmit video content to content presentation devices for presentation on display devices of end-users who are cable-television subscribers through hybrid fiber/coaxial cable connections. A content presentation device can be implemented as a part of a media device, a content server providing content to the media device, or a computing device in general. A system can refer to any device or various systems described herein.

As such, in various scenarios, a content distribution system can transmit content to a content presentation device, which can receive and output the content for presentation at a display device to an end-user. In some situations, even though the content presentation device receives content from the content distribution system, it can be desirable for the content presentation device to perform a content modification operation so that the content presentation device can output to the display device for presentation alternative content instead of at least a portion of that received content.

For example, in the case where the content presentation device receives a linear sequence of content segments that includes a given advertisement segment positioned somewhere within the sequence, it can be desirable for the content presentation device to replace the given advertisement segment with a different advertisement segment that is perhaps more targeted to the end-user (e.g., more targeted to the end-user's interests, demographics, etc.). The linear sequence of content segments can be referred to as linear TV content. As another example, it can be desirable for the content presentation device to overlay on the given advertisement segment, overlay content that enhances the given advertisement segment in a way that is again perhaps more targeted to the end-user. The described content modification system can facilitate providing these and other related features.

In one example, the content modification system can include a fingerprint matching server that can identify an upcoming content modification opportunity on an identified channel, which it can do by comparing and detecting a match between two different instances of fingerprint data. Based on the detected match, the fingerprint matching server can then transmit fingerprint data and metadata to the content presentation device to facilitate preparing the content presentation device to perform a content modification operation in connection with the identified upcoming content modification opportunity.

However, in other cases, it may be desirable for the content presentation device to use one or more alternative techniques to facilitate performing a content modification operation.

For example, the fingerprint matching server can use broadcast-schedule data to facilitate the content presentation device performing a content modification operation. Among other things, this can allow the content presentation device to facilitate performing a content modification operation without using fingerprint data or by using fingerprint data in a more limited fashion. This can be beneficial in the case where the content presentation device does not receive or otherwise have access to fingerprint data, or where the use of fingerprint data is undesirable for one or more reasons (e.g., because fingerprint-based techniques may be computationally expensive).

For dynamic advertisement insertion (DAI), when a content presentation device receives a linear sequence of content segments that includes an original advertisement segment positioned somewhere within the sequence, the content presentation device can replace the original advertisement segment with a replacement advertisement segment that is perhaps more targeted to the end-user.

DAI can have big impact in business. Often advertisers want to create media buzz and media conversations around their adverts as the media buzz is the equivalent of free advertising. In order to have an advertisement trending, there needs to be a lot of discussions and impressions about the advertisement in a short period of time rather than spreading the same amount of discussions and impressions over a long period of time. Traditionally, OTT advertisements may likely spread out advertisement impressions over a long period of time that is not suited to have the advertisements trending.

Embodiments herein present mechanism for managing content segments of linear TV content and OTT content to coordinate the display of content segments in linear TV devices and OTT media devices. To have a content segment, such as an advertisement, receiving media attention and conservation, the content segment can be selected as being a premiere content segment to receive wide distribution to both linear TV devices and OTT media devices over a short period of time. When the content segment is scheduled to be displayed at a TV channel at a scheduled time instance, a copy of the content segment can be distributed to a large number of OTT media devices at a selected time instance that is close to the scheduled time instance. The selected time instance can be referred to as an OTT time instance as well. For example, the content segment can be scheduled to be displayed at the scheduled time instance according to a program log provided by the content source. A content server can select the content segment according to the program log used by automatic content recognition (ACR) server, identify the scheduled time instance based on the program log, and further provide copies of the content segment to many OTT media devices at an OTT time instance. Therefore, the content server can use ACR to detect the scheduled time instance on linear TV content for the content segment, and further boost the showing of the content segment on many OTT media devices just after or before the content segment is shown on linear TV devices. Since the copies of the content segment are provided to many OTT media devices at the OTT time instance that is around the scheduled time instance for the content segment shown on linear TV devices, a large number of impressions of the content segment can be achieved. Such a large number of impressions of the content segment by both OTT media devices and linear TV devices can likely lead to media buzz, media discussion, or media conversation.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media in combination with traditional media, such as linear TV program, OTT program, as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may include a content presentation device, a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide multimedia content to display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, display device 108, using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

In some embodiments, the audio data may be alternatively or additionally processed and analyzed by an audio command processing module in media device 106. Media device 106 and system servers 126 may then cooperate to pick one of the verbal commands to process (either the verbal command recognized by audio command processing module 130 in system servers 126, or the verbal command recognized by audio command processing module in media device 106).

Multimedia environment 102 may include a content modification system 123 coupled to a content source device 125. Content source device 125 may have a linear TV content provided to a plurality of linear TV devices, such as a linear TV device 136 of a media system 134, to be displayed at a TV channel at a scheduled time instance. In addition, content source device 125 may provide the linear TV content to content modification system 123 to perform content modification, which may be further provided to content server 120. Details of content modification system 123 are shown in FIG. 3. In some embodiments, content modification system 123 can also include one or more connection mechanisms that connect various components within content modification system 123. For example, content modification system 123 can include the connection mechanisms represented by lines connecting components of content modification system 123, as shown FIGS. 2 and 3.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Content modification system 123 and/or components thereof can take the form of a computing system, an example of which is described below.

Notably, in practice, content modification system 123 is likely to include many instances of at least some of the described components. For example, content modification system 123 is likely to include many content distribution systems and many content presentation devices.

Figure 2:
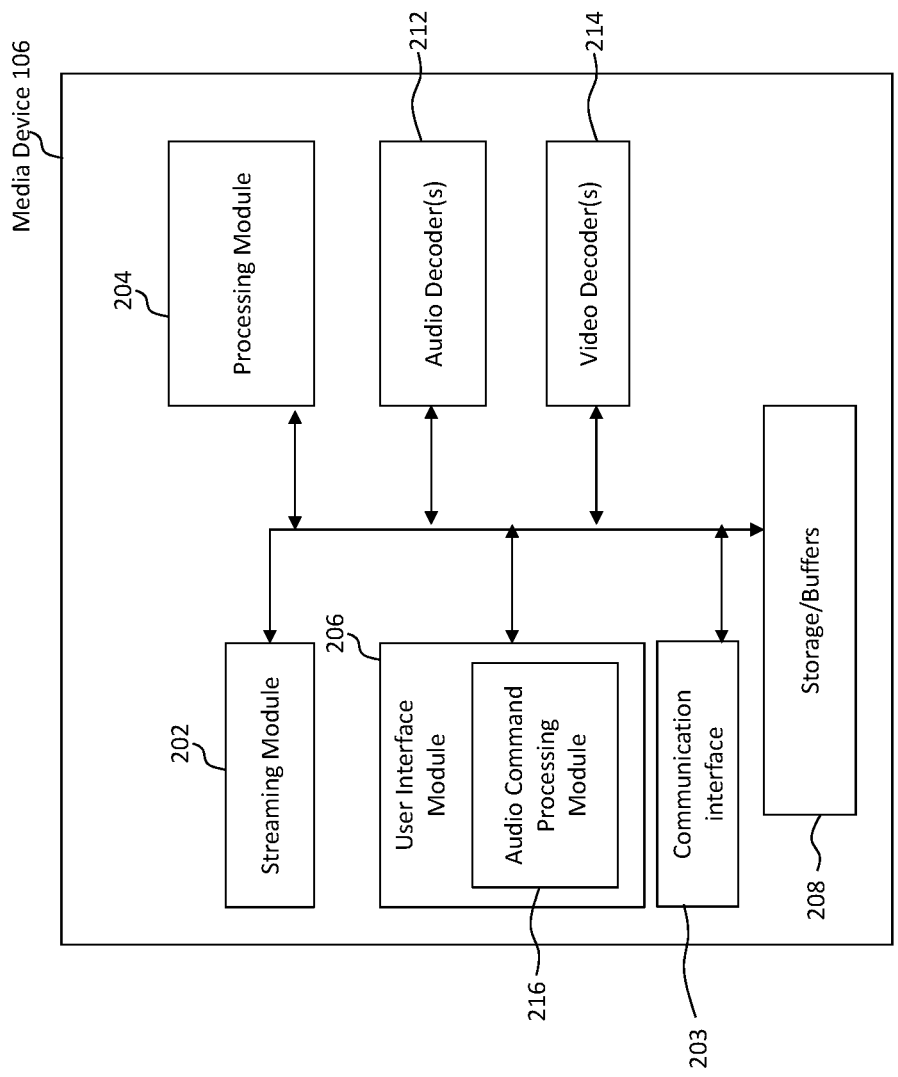
FIG. 2 illustrates a simplified block diagram of an example computing system in which various described principles can be implemented, according to some embodiments.
Figure 3:
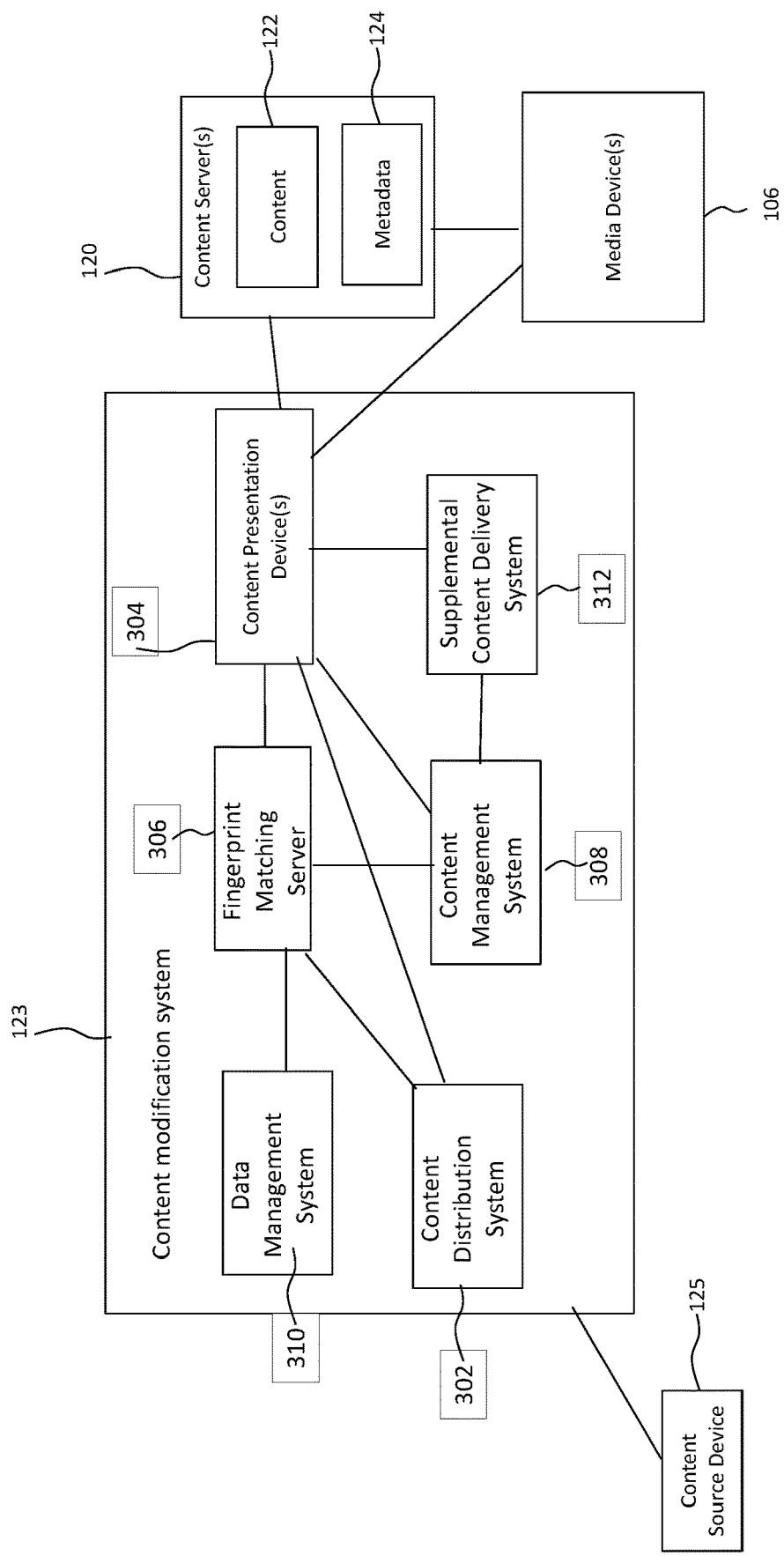
FIG. 3 illustrates a simplified block diagram of an example content modification system in which various described principles can be implemented, according to some embodiments.

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216. Media device 106 may also include a communication interface 203.

In some embodiments, media device 106 can take the form of a desktop computer, a laptop, a tablet, a mobile phone, a television set, a set-top box, a television set with an integrated set-top box, a media dongle, or a television set with a media dongle connected to it, among other possibilities.

Processing module 204 can be or include a general-purpose processor (e.g., a microprocessor) and/or a special-purpose processor (e.g., a digital signal processor). Processing module 204 can execute program instructions included in storage/buffers 208 as described below.

Storage/buffers 208 can be or include one or more volatile, non-volatile, removable, and/or non-removable storage components, such as magnetic, optical, and/or flash storage, and/or can be integrated in whole or in part with processing module 204. Further, storage/buffers 208 can be or include a non-transitory computer-readable storage medium, having stored thereon program instructions (e.g., compiled or non-compiled program logic and/or machine code) that, upon execution by processing module 204, cause media device 106 and/or another computing system to perform one or more operations, such as the operations described in this disclosure. These program instructions can define, and/or be part of, a discrete software application.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

In some instances, media device 106 can execute program instructions in response to receiving an input, such as an input received via communication interface 203 and/or user interface module 206. Storage/buffers 208 can also store other data, such as any of the data described in this disclosure.

Communication interface 203 can allow media device 106 to connect with and/or communicate with another entity according to one or more protocols. Therefore, media device 106 can transmit data to, and/or receive data from, one or more other entities according to one or more protocols. In one example, communication interface 203 can be or include a wired interface, such as an Ethernet interface or a High-Definition Multimedia Interface (HDMI). In another example, the communication interface module 203 can be or include a wireless interface, such as a cellular or WI-FI interface.

User interface module 206 can allow for interaction between media device 106 and a user of media device 106. As such, user interface module 206 can be or include an input component such as a keyboard, a mouse, a remote controller, a microphone, and/or a touch-sensitive panel. User interface module 206 can also be or include an output component such as a display device (which, for example, can be combined with a touch-sensitive panel) and/or a sound speaker.

Media device 106 can also include one or more connection mechanisms that connect various components within media device 106. For example, media device 106 can include the connection mechanisms represented by lines that connect components of media device 106, as shown in FIG. 2.

Media device 106 can include one or more of the above-described components and can be configured or arranged in various ways. For example, media device 106 can be configured as a server and/or a client (or perhaps a cluster of servers and/or a cluster of clients) operating in one or more server-client type arrangements, for instance.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

FIG. 3 illustrates a simplified block diagram of content modification system 123 in which various described principles can be implemented, according to some embodiments.

As shown in FIG. 3, content modification system 123 can include various components, such as a content distribution system 302, a content presentation device 304, a fingerprint matching server 306, a content management system 308, a data management system 310, and/or a supplemental content delivery system 312. Content modification system 123 and/or components thereof can be configured to perform and/or can perform one or more operations. Examples of these operations and related features will now be described.

As noted above, in practice, content modification system 123 is likely to include many instances of at least some of the described components. Likewise, in practice, it is likely that at least some of described operations will be performed many times (perhaps on a routine basis and/or in connection with additional instances of the described components).

For context, general operations and examples related to content distribution system 302 transmitting content and content presentation device 304 for receiving and outputting content will now be described.

To begin, content distribution system 302 can transmit content (e.g., that it received from a content provider through content source device 125) to one or more entities such as content presentation device 304 and further to media device 106. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

Content distribution system 302 can transmit content on one or more channels (sometimes referred to as stations or feeds). As such, the content distribution system 302 can be associated with a single channel content distributor or a multi-channel content distributor such as a multi-channel video program distributor (MVPD).

Content distribution system 302 and its means of transmission of content on the channel to content presentation device 304 can take various forms. By way of example, content distribution system 302 can be or include a cable-television head-end that is associated with a cable-television provider and that transmits the content on the channel to content presentation device 304 through hybrid fiber/coaxial cable connections. As another example, content distribution system 302 can be or include a satellite-television head-end that is associated with a satellite-television provider and that transmits the content on the channel to content presentation device 304 through a satellite transmission. As yet another example, content distribution system 302 can be or include a television-broadcast station that is associated with a television-broadcast provider and that transmits the content on the channel through a terrestrial over-the-air interface to content presentation device 304. In these and other examples, content distribution system 302 can transmit the content in the form of an analog or digital broadcast stream representing the content.

In some examples, content presentation device 304 can receive content from one or more entities, such as content distribution system 302. In one example, content presentation device 304 can select (e.g., by tuning to) a channel from among multiple available channels, perhaps based on input received via a user interface, such that content presentation device 304 can receive content on the selected channel. In some examples, content presentation device 304 can be coupled to content server 120 to deliver content to media device 106. In some examples, content presentation device 304 can be coupled to media device 106 directly. In some examples, content presentation device 304 can be implemented as a part of content server 120 or media device 106.

In some examples, content distribution system 302 can transmit content to content presentation device 304, which content presentation device 304 can receive, and therefore the transmitted content and the received content can be the same. However, in other examples, they can be different, such as where content distribution system 302 transmits content to content presentation device 304, but content presentation device 304 does not receive the content and instead receives different content from a different content distribution system. Additionally and alternatively, content presentation device 304 receives the content and make changes to the received contents with other contents, such as contents received from supplement content delivery system 312. More details of such modification can be shown in FIG. 4.

Content presentation device 304 can also output content for presentation at media device 106 or display device 108. As noted above, media device 106 can take various forms. In one example, in the case where media device 106 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where media device 106 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, content distribution system 302 can transmit content to content presentation device 304, which is further provided to media device 106 and displayed on display device 108 for presentation to an end-user. In some situations, even though content presentation device 304 receives content from content distribution system 302, it can be desirable for content presentation device 304 to perform a content modification operation so that content presentation device 304 can output for presentation alternative content instead of at least a portion of that received content.

For example, in the case where content presentation device 304 receives a linear sequence of content segments that includes a given advertisement segment positioned somewhere within the sequence, it can be desirable for content presentation device 304 to replace the given advertisement segment with a replacement advertisement segment that is perhaps more targeted to the end-user (i.e., more targeted to the end-user's interests, demographics, etc.). The replacement advertisement segment can be received from supplement content delivery system 312. As another example, it can be desirable for content presentation device 304 to overlay on the given advertisement segment, overlay content that enhances the given advertisement segment in a way that is again perhaps more targeted to the end-user. The described content modification system 123 can facilitate providing these and other related features.

As noted above, in one example, content can take the form of a linear sequence of content segments. As such, in one example, content distribution system 302 can transmit a linear sequence of content segments. This is referred to herein as a "transmission sequence." Likewise, content presentation device 304 can receive a linear sequence of content segments. This is referred to herein as a "receipt sequence." In line with the discussion above, the transmission sequence and the receipt sequence can be the same or they can be different.

Figure 4:
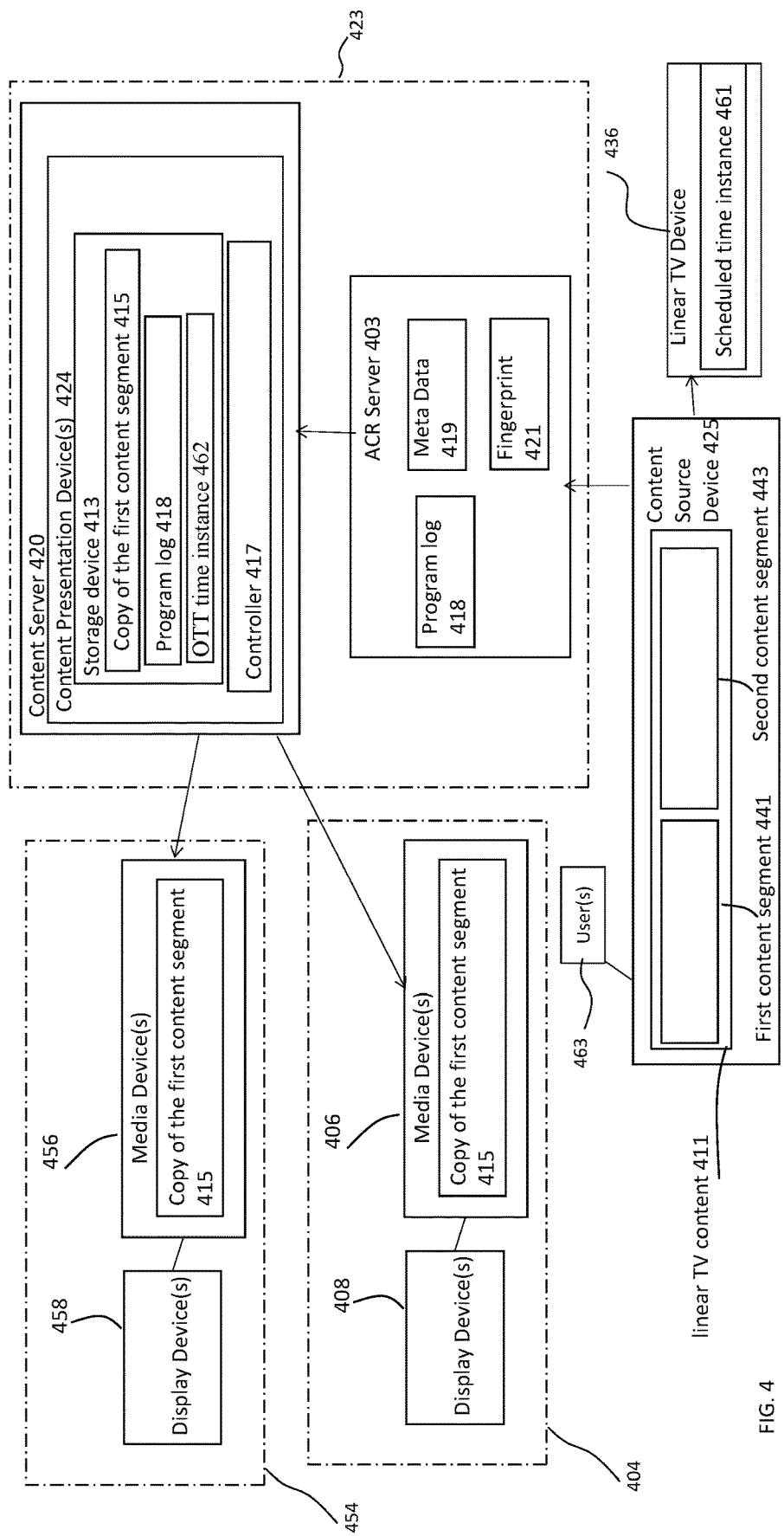
FIG. 4 illustrates a simplified block diagram of an example system for managing content segments of linear TV content and over-the-top (OTT) content, according to some embodiments.

FIG. 4 illustrates a simplified block diagram of an example content modification system 423 in which various described principles can be implemented, according to some embodiments. Content modification system 423 can be an example of content modification system 123 as shown in FIGS. 1 and 3.

In some embodiments, content modification system 423 can include a content presentation device 424, an automatic content recognition (ACR) server 403 performing functions of fingerprint matching server 306. For example, ACR server 403 may be coupled to content source device 425 to receive a linear TV content 411 provided by content source device 425, and further generate fingerprint 421 and metadata 419 for linear TV content 411. Other components of content modification system 423, such as a content distribution system, a data management system, are not shown explicitly.

In some embodiments, content presentation device 424 can include various components such as a storage device 413 and a controller 417. In some embodiments, content presentation device 424 can be implemented as a part of a content server 420, which is further coupled to other media devices of media systems. For example, content presentation device 424 and content server 420 are coupled to a media system 404 including a media device 406 and a display device 408, and to a media system 454 including a media device 456 and a display device 458. In some embodiments, media system 404 includes media device 406 and display device 408, or media system 454 includes media device 456 and display device 458 can be examples of media system 104 including media device 106 and display device 108 as shown in FIG. 1.

In some embodiments, content modification system 423 can be coupled to content source device 425, where content modification system 423 and content source device 425 are examples of content modification system 123 and content source device 125 as shown in FIG. 1. In addition, content source device 425 can be coupled to one or more linear TV device 436 to provide linear TV content 411 to linear TV device 436. In some embodiments, linear TV device 436 can be an ACR enabled device, or STB, and can include an ACR enabled display device.

In some embodiments, content source device 425 can provide a linear sequence of content segments, such as linear TV content 411. Linear TV content 411 can include multiple content segments, such as a first content segment 441, a second content segment 443, and more. Linear TV content 411 can be the "transmission sequence," and can be a streaming media program on a channel, or any content delivered as a linear TV program, an over-the-top television (OTT) program, or other streaming content. Linear TV content 411 can be provide to linear TV device 436 without modification. The first content segment 441 and the second content segment 443 of linear TV 411 provided to linear TV device 436 can be displayed at a TV channel at a scheduled time instance 461. The TV channel for displaying first content segment 441 at the scheduled time instance 461 can be determined based on a program log 418 provided to ACR server 403. In some embodiments, program log 418 can be provided to ACR server 403 by content source device 425.

In some embodiments, storage device 413 of content presentation device 424 can store a plurality of content segments, such as a copy of the first content segment 415, which has the same content as the first content segment 441. Controller 417 of content presentation device 424 can be configured to perform various operations shown in FIG. 5 and described below.

Figure 5:
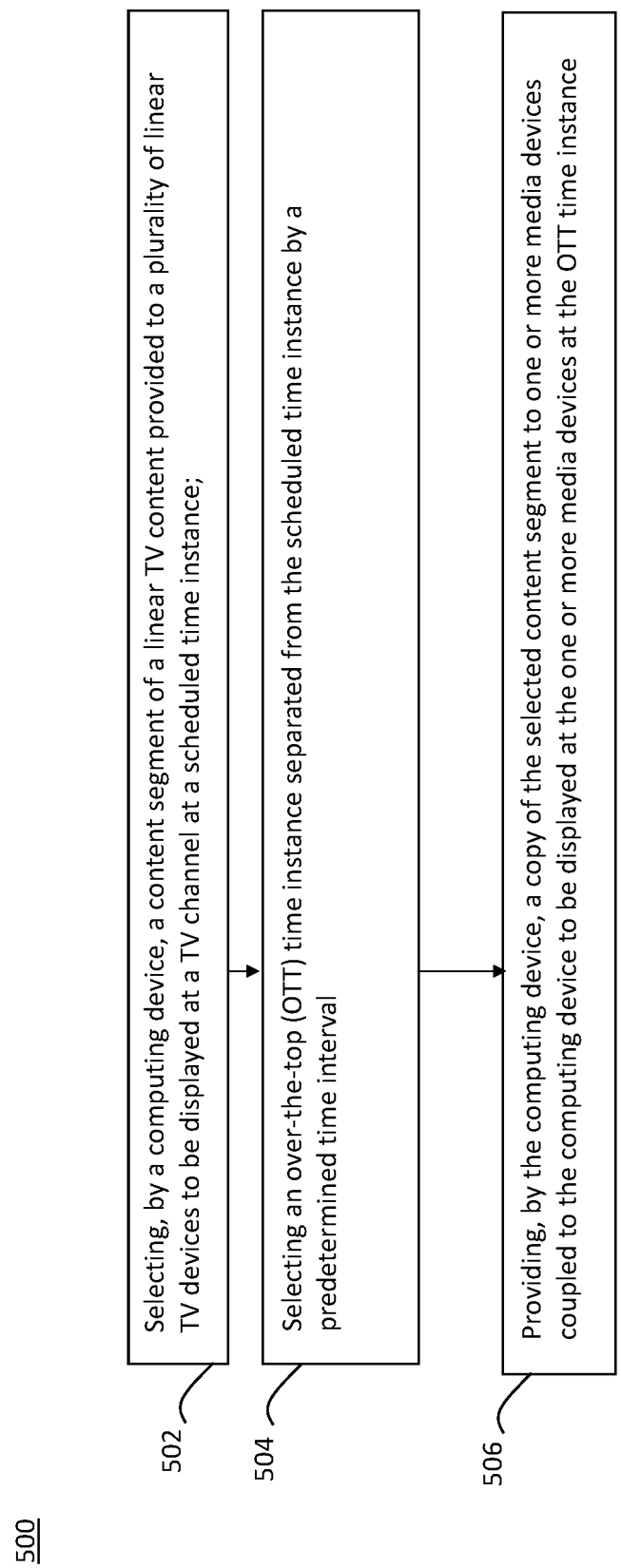
FIG. 5 illustrates an example process for managing content segments of linear TV content and OTT content, according to some embodiments.

FIG. 5 illustrates an example process 500 for managing content segments of linear TV content and OTT content, according to some embodiments. Process 500 can be performed by controller 417, content presentation device 424, or content server 420 that is coupled to multiple media systems such as media system 404 and media system 454.

In some embodiments, at 502, controller 417 can select a content segment, e.g., the first content segment 441, from a plurality of content segments including the first content segment 441 and the second content segment 443. The selected content segment can be a part of linear TV content 411 provided to a plurality of linear TV devices, e.g., linear TV device 436, to be displayed at a TV channel at a scheduled time instance 461. In some embodiments, the plurality of linear TV devices, e.g., linear TV device 436, can be ACR enabled devices. In some embodiments, the first content segment 441 can be selected based on a number of linear TV devices showing or going to show the first content segment 441 at the TV channel according to program log 418 used by ACR server 403. Program log 418 can be received by controller 417 or content presentation device 424 from content source device 425. In some other embodiments, the first content segment 441 can be an advertisement segment of linear TV content 411, and can be selected based on an indication from a user 463 who may be an advertiser providing the first content segment 441 to content source device 425.

In some embodiments, at 504, controller 417 can further select an OTT time instance 462 separated from scheduled time instance 461 by a predetermined time interval, to provide a copy of the selected content segment, e.g., copy of the first content segment 415, to multiple media devices. As shown in FIG. 4, the copy of the first content segment 415 is provided to media device 406 and media device 456. In some embodiments, OTT time instance 462 can be ahead of and separated from scheduled time instance 461 by the predetermined time interval, such as within a predetermined time interval of about 30 minutes length. In some embodiments, OTT time instance 462 can be after and separated from scheduled time instance 461 by the predetermined time interval.

In some embodiments, at 506, controller 417 can provide a copy of the first content segment 441, which may be referred to as copy of the first content segment 415, to one or more media devices, such as media device 406 and media device 456, coupled to controller 417 to be displayed at the one or more media devices at the OTT time instance 462. In some embodiments, the copy of the first content segment 415 can be an OTT advertisement segment. In some embodiments, the one or more media devices, such as media device 406 and media device 456, can include a device that is capable to perform a dynamic advertisement insertion to insert the copy of the first content segment 415 to be displayed. In some embodiments, controller 417 and content presentation device 424 can be implemented within a media device, such as media device 406 to perform functions described herein.

In some embodiments, content server 420 can select the content segment according to program log 418 used by ACR server 403, identify the scheduled time instance 461 based on program log 418, and further provide copies of the content segment to many OTT media devices at an OTT time instance. Therefore, content server 420 can use ACR to detect the scheduled time instance 461 on linear TV content for the content segment, and further boost the showing of the content segment on many OTT media devices just after or before the content segment is shown on linear TV devices.

Example Computer System

Figure 6:
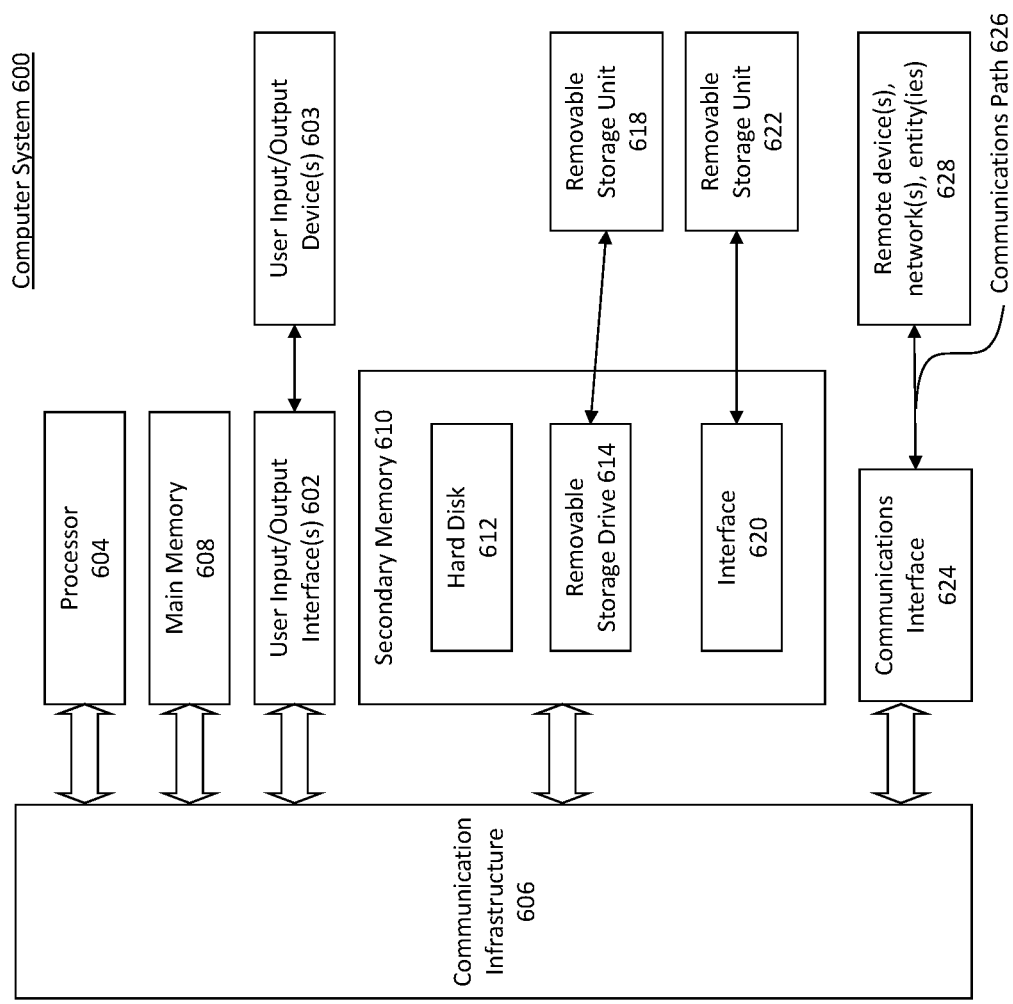
FIG. 6 illustrates an example computer system useful for implementing various embodiments.

Various embodiments may be implemented, for example, using one or more well-known computer systems, such as computer system 600 shown in FIG. 6. For example, media device 106, display device 108, content serers 120, devices within content modification system 123, content source device 125, linear TV device 136, media device 406, display device 408, media device 456, display device 458, ACR server 403, content server 420, content presentation device 424, linear TV device 436, or content source device 425 may be implemented using combinations or sub-combinations of computer system 600 to perform various functions described herein, e.g., by process 500. Additionally or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   selecting, by a computing device, a content segment of a linear TV content provided to a plurality of linear TV devices to be displayed at a TV channel at a scheduled time instance;
   selecting an over-the-top (OTT) time instance separated from the scheduled time instance by a predetermined time interval; and
   providing a copy of the selected content segment to one or more media devices coupled to the computing device to be displayed at the one or more media devices at the OTT time instance.

2. The method of claim 1, wherein the content segment is an advertisement segment of the linear TV content, and the copy of the selected content segment is an OTT advertisement segment.

3. The method of claim 1, wherein the OTT time instance is ahead of and separated from the scheduled time instance by the predetermined time interval.

4. The method of claim 1, wherein the predetermined time interval has about 30 minutes length.

5. The method of claim 1, wherein the OTT time instance is after and separated from the scheduled time instance by the predetermined time interval.

6. The method of claim 1, wherein the plurality of linear TV devices are automatic content recognition (ACR) enabled devices, and the selecting the content segment of the linear TV content comprises selecting the content segment based on a number of linear TV devices showing or going to show the content segment at the TV channel according to a program log used by the ACR enabled devices.

7. The method of claim 1, wherein the selecting the content segment of the linear TV content comprises selecting the content segment based on an indication from a user.

8. The method of claim 1, wherein the one or more media devices include a device that is capable to perform a dynamic advertisement insertion to insert the copy of the selected content segment to be displayed.

9. The method of claim 6, further comprising:
receiving the program log, wherein the selecting the content segment of the linear TV content comprises selecting the content segment based on the program log.

10. A system, comprising:
at least one controller configured to:
select a content segment from a plurality of content segments, wherein the content segment is a part of linear TV content provided to a plurality of linear TV devices to be displayed at a TV channel at a scheduled time instance;
select an over-the-top (OTT) time instance separated from the scheduled time instance by a predetermined time interval; and
provide a copy of the selected content segment to one or more media devices coupled to the system to be displayed at the one or more media devices at the OTT time instance.

11. The system of claim 10, wherein the content segment is an advertisement segment of the linear TV content, and the copy of the selected content segment is an OTT advertisement segment.

12. The system of claim 10, wherein the OTT time instance is ahead of and separated from the scheduled time instance by the predetermined time interval.

13. The system of claim 10, wherein the OTT time instance is after and separated from the scheduled time instance by the predetermined time interval.

14. The system of claim 10, wherein the plurality of linear TV devices are automatic content recognition (ACR) enabled devices, and wherein to select the content segment of the linear TV content, the controller is configured to select the content segment based on a number of linear TV devices showing or going to show the content segment at the TV channel according to a program log used by the ACR enabled devices.

15. The system of claim 10, wherein the one or more media devices include a device that is capable to perform a dynamic advertisement insertion to insert the copy of the selected content segment to be displayed.

16. The system of claim 14, wherein the processor is further configured to:
receive the program log, wherein the content segment is selected based on the program log.

17. A non-transitory computer-readable medium having instructions stored thereon that, when executed by at least one computing device, cause the computing device to perform operations comprising:
selecting a content segment of a linear TV content provided to a plurality of linear TV devices to be displayed at a TV channel at a scheduled time instance;
selecting an over-the-top (OTT) time instance separated from the scheduled time instance by a predetermined time interval; and
providing a copy of the selected content segment to one or more media devices coupled to the at least one computing device to be displayed at the one or more media devices at the OTT time instance.

18. The non-transitory computer-readable medium of claim 17, wherein the content segment is an advertisement segment of the linear TV content, and the copy of the selected content segment is an OTT advertisement segment.

19. The non-transitory computer-readable medium of claim 17, wherein the OTT time instance is ahead of and separated from the scheduled time instance by a predetermined time interval.

20. The non-transitory computer-readable medium of claim 17, wherein the OTT time instance is after and separated from the scheduled time instance by a predetermined time interval.

* * * * *